US012272911B2

(12) United States Patent
Chin

(10) Patent No.: US 12,272,911 B2
(45) Date of Patent: Apr. 8, 2025

(54) POWER ADAPTING DEVICE

(71) Applicant: ENERGY FULL ELECTRONICS CO., LTD., New Taipei (TW)

(72) Inventor: Hsu-Shen Chin, New Taipei (TW)

(73) Assignee: Energy Full Electronics Co., Ltd, New Taipel (TW)

( * ) Notice: Subject to any disclaimer, the term of this patent is extended or adjusted under 35 U.S.C. 154(b) by 389 days.

(21) Appl. No.: 18/052,918

(22) Filed: Nov. 6, 2022

(65) Prior Publication Data

US 2023/0143416 A1 May 11, 2023

(30) Foreign Application Priority Data

Nov. 5, 2021 (TW) ................................ 110213119

(51) Int. Cl.
*H01R 27/00* (2006.01)
*H01R 13/66* (2006.01)
*H01R 24/76* (2011.01)
*H01R 103/00* (2006.01)

(52) U.S. Cl.
CPC ......... *H01R 27/00* (2013.01); *H01R 13/6675* (2013.01); *H01R 24/76* (2013.01); *H01R 2103/00* (2013.01)

(58) Field of Classification Search
CPC .... H01R 27/00; H01R 13/6675; H01R 24/76; H01R 2103/00; H01R 13/6205; H01R 24/22; H01R 13/70; H01R 27/02
See application file for complete search history.

(56) References Cited

U.S. PATENT DOCUMENTS

| | | | | |
|---|---|---|---|---|
| 7,556,511 B1 * | 7/2009 | Hsu | H01R 25/142 | 439/652 |
| 8,246,364 B2 * | 8/2012 | Chen | H01R 13/635 | 439/136 |
| 10,741,984 B2 * | 8/2020 | Chin | H01R 25/003 | |
| 2013/0109219 A1 * | 5/2013 | Liao | H01R 13/743 | 439/535 |

FOREIGN PATENT DOCUMENTS

EP 3913780 B1 * 6/2022 .......... H01R 13/502

* cited by examiner

*Primary Examiner* — Briggitte R. Hammond

(57) ABSTRACT

A power adapting device includes an upper housing, a power conversion module, and a lower housing. The upper housing comprises a first slot and a second slot. A first power adapter interface is disposed at a bottom of the first slot. A second power adapter interface is disposed at a bottom of the second slot. The first power adapter interface conducts an AC power signal to an external device. The second power adapter interface conducts a DC power signal to an external device. The power conversion module converts the AC power signal into the DC power signal and to transmit the converted DC power signal to the second power adapter interface. The lower housing covers the power conversion module with the upper housing. The lower housing includes a cable transfer interface for transmitting the external power supply to the first power adapter interface or the power conversion module.

14 Claims, 11 Drawing Sheets

POWER ADAPTING DEVICE

CROSS REFERENCE TO RELATED APPLICATION

This application claims priority to Taiwanese Application No. 110213119, filed on Nov. 5, 2021. The entire disclosures of the above applications are incorporated herein by reference.

FIELD OF THE INVENTION

The present disclosure relates to a power adapting device, more particularly, to an expandable power adapting device structure of a replaceable receptacle.

BACKGROUND

Electronic products are widely used in a modern life. A power supply is an integral part of the use of electronic products. However, with the development of science and technology, all kinds of electronic products have developed a variety of transmission interfaces to meet the needs, which leads to the need for different specifications of power receptacles when connecting various electronic products to the power supply. When traveling abroad, each country has dozens of plug specifications, European specifications, and American specifications. In addition, 3C products, such as mobile phones and laptops, must use the universal serial bus (USB) interface receptacle for charging. However, the USB is divided into type A, type B, type C, and other specifications. Moreover, most household appliances use an alternating current (AC) power supply directly, while small 3C products use a direct current (DC) power supply for powered or charging.

It can be seen from the above that a variety of power specifications make it very troublesome to select receptacles. Although there are many kinds of receptacle adapters or transformers sold on the market, when a variety of products are used together, the cost of adapters or transformers will become considerable. In addition, the non-uniform shape of each adapter or transformer product will also lead to restrictions on the use space, which will not only cause crowding and unsightly space, but also may cause doubts about the safety of electricity use.

SUMMARY

An embodiment of the present disclosure is directed to a power adapting device. The power adapting device comprises an upper housing, a power conversion module, and a lower housing. The upper housing comprises a first slot and a second slot. A first power adapter interface is disposed at a bottom of the first slot. A second power adapter interface is disposed at a bottom of the second slot. The first power adapter interface is configured for conducting an alternate current (AC) power signal to an external device. The second power adapter interface is configured for conducting a direct current (DC) power signal to an external device. The power conversion module, disposed corresponding to the second power adapter interface, is configured to convert the AC power signal into the DC power signal and to transmit the converted DC power signal to the second power adapter interface. The lower housing mates with the upper housing and covers the power conversion module with the upper housing. The lower housing includes a cable transfer interface, electrically connected to an external power supply for transmitting the external power supply to the first power adapter interface or the power conversion module.

Optionally, the power adapting device further includes an expansion interface, electrically connected to the cable transfer interface or the power conversion module, for transmitting the AC power signal or the DC power signal to another power adapting device.

Optionally, the second power adapter interface is a pogo pin.

Optionally, the power adapting device further includes a plurality of power adapters, correspondingly coupled to the first power adapter interface and the second power adapter interface. The first power adapter interface conducts the AC power signal to the external device through one of the power adapters, and the second power adapter interface conducts the DC power signal to the external device through one of the power adapters.

Optionally, the power adapter corresponding to the second power adapter interface is provided with a magnetic component for attracting the second power adapter interface.

Optionally, the second power adapter interface is provided with a magnetic component for attracting the corresponding power adapter.

Optionally, the upper housing is provided with a plurality of slots, each of which is provided with an opening. Each of the power adapters is installed in one of the plurality of slots to connect to the first power adapter interface or the second power adapter interface through the opening of the slots.

Optionally, a way in which the power adapters installed in the slots has no directionality.

Optionally, the lower housing is provided with a first side wall, a third side wall opposite to the first side wall, and a buckling portion disposed on the third side wall. The power adapting device further comprises a flip cover, connected to the first side wall of the lower housing and provided with an engaging portion engaging the buckling portion of the lower housing to fix the power adapters.

Optionally, a size of the second slot is smaller than a size of the first slot.

Optionally, the power adapting device further includes an expansion adapter, provided with a first end connecting to the expansion interface and a second end connecting to a cable transfer interface of another power adapter.

Optionally, the first end of the expansion adapter is a female interface, and the second end is a male interface; or the first end of the expansion adapter is the male interface, and the second end is the female interface.

Optionally, the power adapting device further includes a cable device, electrically connected to the external power supply and the cable transfer interface.

Optionally, the power adapting device further includes a protection switch, controlling whether the cable transfer interface transmits the external power supply.

Through the embodiment disclosed in the present disclosure, the same power adapting device is capable of supplying both AC power and DC power, and through the power adapting device of the present disclosure, a variety of receptacle types of different specifications may be switched, which is not only convenient but also saves space costs. In addition, the user can use the expansion adapter to extend and connect more power adapting devices according to requirements.

These and other features, aspects and advantages of the present disclosure will become understood with reference to the following description, appended claims and accompanying figures.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF THE EMBODIMENTS

In order to facilitate understanding the technical features, content and advantages of the invention and the efficacy it can achieve, the present disclosure is hereby combined with the accompanying drawings, and the expression of the embodiment is described in detail as follows, and the scheme used therein, the main purpose of which is only for illustrative and auxiliary explanation purposes, may not be the true proportion and precise configuration of the embodiment of the present disclosure, so the proportion and configuration relationship of the attached drawing should not be interpreted, limiting the scope of rights of the invention in the actual implementation.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

The following will refer to the relevant drawings, illustrating various embodiments of the electrical connector and base according to the present disclosure, for ease of understanding, the same components in the following embodiments are illustrated by the same symbols.

Figure 1:
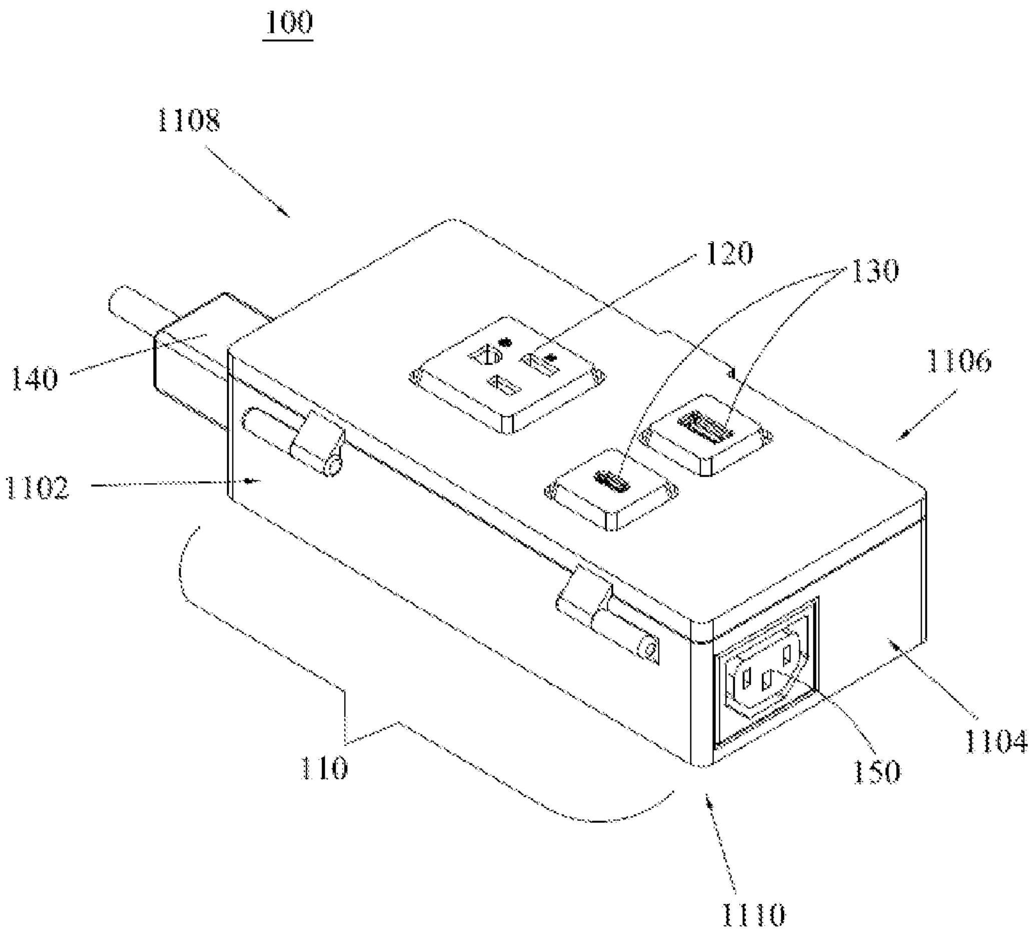
FIG. 1 is a schematic diagram of a power adapting device according to one embodiment of the present disclosure.

Please refer to FIG. 1, which is a schematic diagram of a power adapting device 100 according to one embodiment of the present disclosure. The power adapting device 100 comprises a lower housing 110, a first power adapter 120, a second power adapter 130, a cable device 140, and an expansion interface 150. The lower housing 110 of the power adapting device 100 may be further divided into a first side wall 1102, a second side wall 1104, a third side wall 1106, a fourth side wall 1108, and a bottom surface 1110. The first side wall 1102, the second side wall 1104, the third side wall 1106, and the fourth side wall 1108 are connected in sequence, and are vertically and circumferentially disposed on the bottom surface 1110 of the lower housing 110. The expansion interface 150 of the power adapting device 100 is disposed on the second side wall 1104, and the cable device 140 of the power adapting device 100 is disposed on the fourth side wall 1108.

The first power adapter 120 is, for example, a receptacle of a general commercial AC power supply, and is used to transmit an AC power signal to an external electronic product. It should be understood that the three-hole (live wire, neutral wire/water wire/null wire, and earth wire) receptacle shown in the figure is only for auxiliary explanation, not for limitation. The first power adapter 120 may also be the specifications of household power receptacles in various regions of the world, such as A-type receptacles, B-type receptacles, C-type receptacles, D-type receptacles, E-type receptacles, F-type receptacles, G-type receptacles, H-type receptacles, I-type receptacle, J-type receptacle, K-type receptacle, L-type receptacle, M-type receptacle, and N-type receptacle.

The power adapting device 100 has two second power adapters 130 in FIG. 1. The size of each of the second power adapters 130 is smaller than that of the first power adapter 120. The second power adapter 130 may, for example, be a USB type A connector, a USB type C connector, or a mixture of the two, to transmit a DC power signal to an external electronic product. It should be understood that the number or type of the second power adapters 130 shown in the figure is only for auxiliary explanation, not for limitation.

The second power adapter 130 may be, for example, a USB type A receptacle, a USB type C receptacle, or a combination of the two, for transmitting DC signals to external electronic products. It should be understood that, the number or type of the second power adapters 130 is exemplified in the figure, which is only used for auxiliary description and is not intended to be limiting.

In one embodiment, the power adapting device 100 may have a single second power adapter 130 or more than three second power adapters 130. In addition, the second power adapter 130 may also be a USB mini-A, a USB mini-B, a USB micro-A, a USB micro-B, a Thunderbolt, a combination thereof, or the like. For example, the power adapting device 100 may have three second power adapters 130, which respectively are USB type A. USB type C, and Thunderbolt interface, so as to supply power to external electronic devices of three corresponding specifications at the same time.

The cable device 140 is used to receive current from an external current source, preferably, it receives an AC power supply. The expansion interface 150 is used to provide a power adapting device 100, which is capable of being connected in series with another same power adapting device 100. Therefore, the power adapting device 100 disclosed in the present disclosure is capable of being substantially extended accordingly as needed to simultaneously supply power to external electronic products of more quantity and/or specifications. The cable device 140 and the expansion interface 150 will be described in more detail below.

Figure 2:
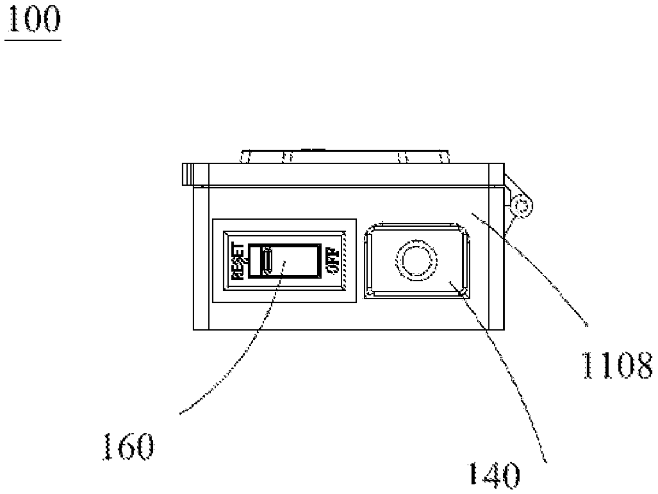
FIG. 2 is a left side view of the power adapting device in FIG. 1.

Please refer to FIG. 2, which is a left side view of the power adapting device 100 in FIG. 1. It can be seen from FIG. 2 that the power adapting device 100 is further provided with a protection switch 160 in the fourth side wall 1108. The protection switch 160 allows the user to manually switch whether the power adapting device 100 receives the external power supply transmitted by the cable device 140.

Figure 3:
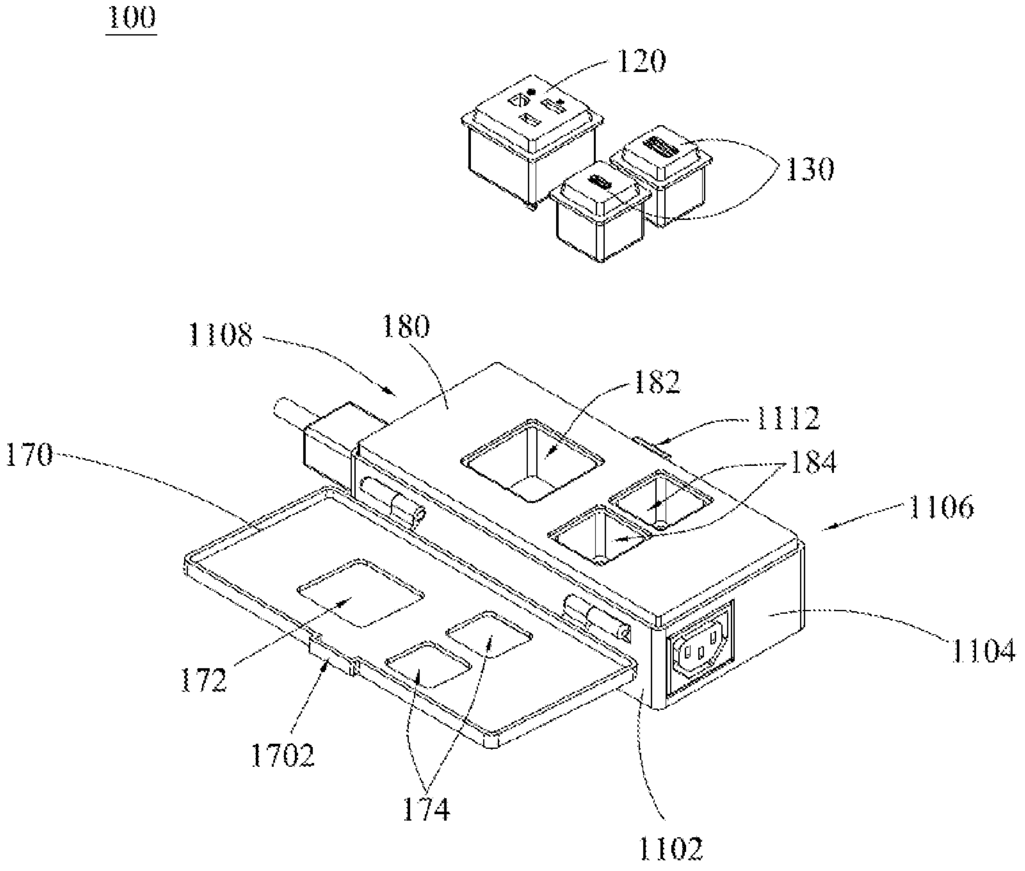
FIG. 3 is a schematic diagram of a first power adapter and a second power adapter separated from an upper housing of the power adapting device in FIG. 1.

Please refer to FIG. 3, which is a schematic diagram of a first power adapter and a second power adapter separated from an upper housing 180 of the power adapting device 100 in FIG. 1. In this embodiment, the power adapting device 100 has a flip cover 170, which is fixed on the lower housing 110 to protect the internal components. The first power adapter 120 and the second power adapter 130 are detachable and replaceable receptacles, and the first power adapter 120 and the second power adapter 130 are fixed by the flip cover 170.

In detail, one side of the flip cover 170 of the power adapting device 100 is fixed to the first side wall 1102 of the lower housing 110 by means of a hinge, for example, so as to facilitate opening and closing. However, the connection manner of the flip cover 170 and the first side wall 1102 is only for auxiliary explanation, not for limitation. In one embodiment, the connection between the flip cover 170 and the first side wall 1102 may also be a flexible plastic element, a plug, an elastic material (such as a spring), or the like. On the other side of the flip cover 170 connected to the first side wall 1102 relative to the flip cover 170, a buckling portion 1702 is provided with. The buckling portion 1702 is disposed corresponding to an engaging portion 1112 of the third side wall 1106 of the lower housing 110. When the flip cover 170 is closed, the buckling portion 1702 thereof will be fitted and fixed with the engaging portion 1112 of the third side wall 1106. The combination method of the buckling portion 1702 and the engaging portion 1112 may be, for example, fixed to each other by means of fastener method, friction force, magnetic attraction, etc., which is not limited in the present disclosure.

The flip cover 170 has a through hole 172 and a through hole 174, the through hole 172 is provided corresponding to the first power adapter 120, and the through hole 174 is provided corresponding to the second power adapter 130. The first power adapter 120 is capable of being connected to a plug of an external device through the through hole 172, and the second power adapter 130 is capable of being connected to a plug of an external device through the through hole 174. Among them, the through holes 172 is slightly smaller than the first power adapter 120, and the through hole 174 is slightly smaller than the second power adapter 130. Therefore, when the flip cover 170 is closed, the first power adapter 120 and the second power adapter 130 can be prevented from being accidentally separated from the power adapting device 100.

In one embodiment, the power adapting device 100 further comprises the upper housing 180. The upper housing 180 is joined with the lower housing 110. The upper housing 180 has a first slot 182 and a second slot 184, which respectively correspond to the first power adapter 120 and the second power adapter 130. The first slot 182 and the second slot 184 are accommodating spaces designed according to the size of the first power adapter 120 and that of the second power adapter 130 to provide access to the first power adapter 120 and the second power adapter 130. It should be understood that the first power adapter 120 and the second power adapter 130 can be of any shape or size, and the first slot 182 and the second slot 184 can also be changed accordingly. For example, when the first power adapter 120 and the second power adapter 130 are cube shaped, the first slot 182 and the second slot 184 served as the accommodating space are also cube shaped and slightly larger than the corresponding power adapter for access. Or, when the first power adapter 120 and the second power adapter 130 are cylinder shaped, the first slot 182 and the second slot 184 as the accommodating space are also cylinder shaped and slightly larger than the corresponding power adapter for access.

Figure 4:
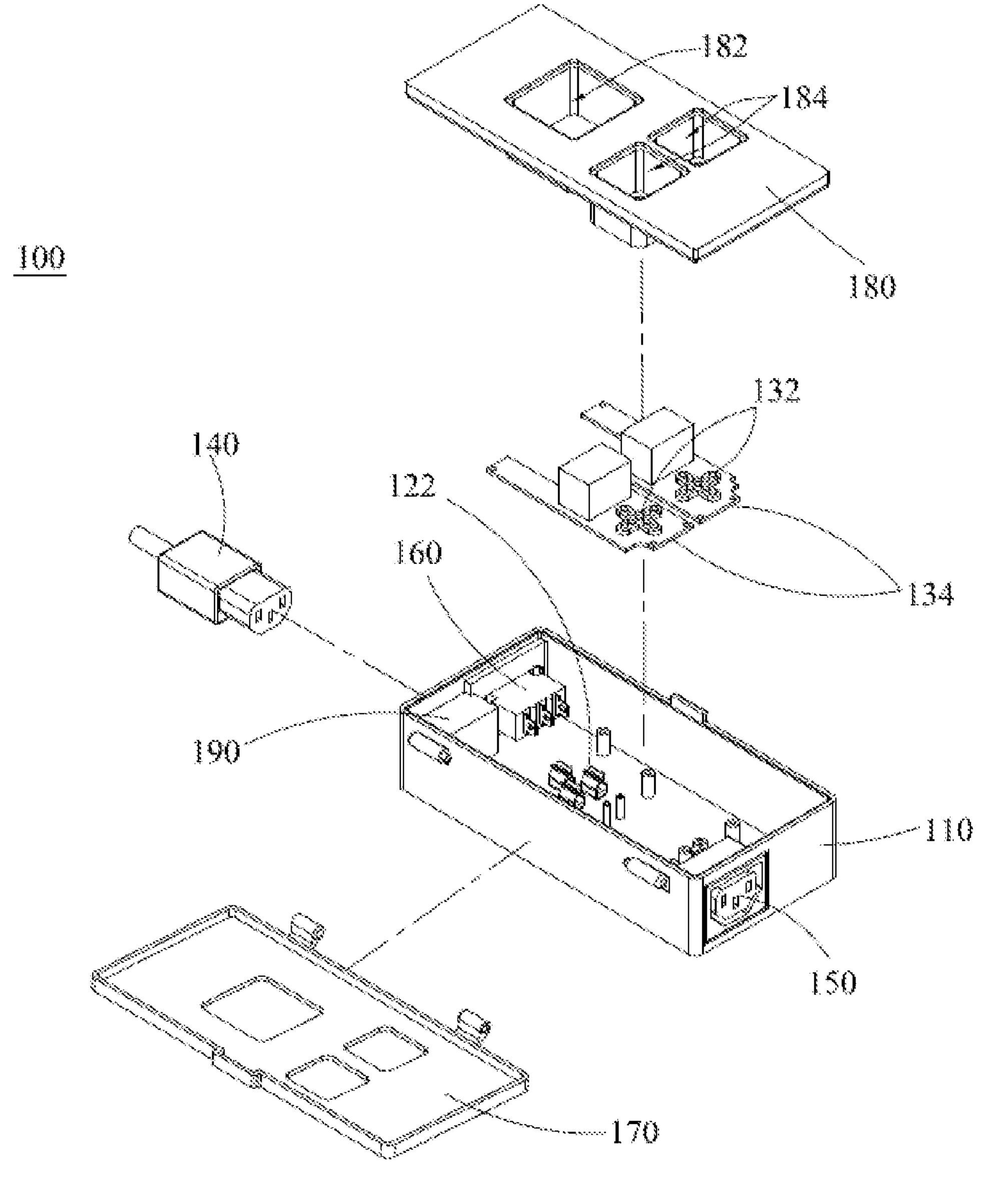
FIG. 4 is an exploded view of the power adapting device according to one embodiment of the present disclosure.

Please refer to FIG. 4, which is an exploded view of the power adapting device 100 according to one embodiment of the present disclosure. The power adapting device 100 is internally provided with a first power adapter interface 122 and a second power adapter interface 132, the second power adapter interface 132 is disposed on the power conversion module 134. In one embodiment, the first power adapter interface 122 is, for example, a three-hole receptacle (the first power adapter interface 122 is composed of three sets of clips as shown in the figure), and the second power adapter interface 132 is, for example, a pogo pin, not for limitation. The first power adapter interface 122 and the second power adapter interface 132 can also be changed according to usage requirements.

Figure 5:
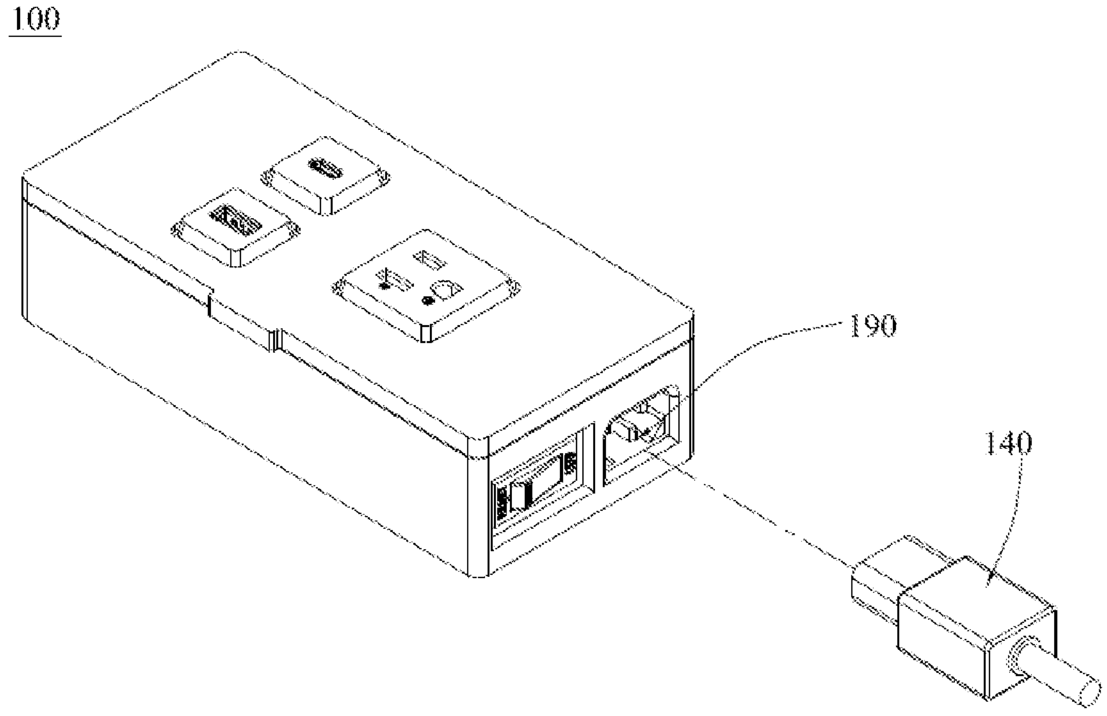
FIG. 5 is a schematic diagram of the power adapting device according to one embodiment of the present disclosure.

In addition, the power adapting device 100 is also provided with a cable transfer interface 190. The cable device 140 can be a separate component through the configuration of the cable transfer interface 190. As shown in FIG. 5, which is a schematic diagram of the power adapting device 100 according to one embodiment of the present disclosure. In the FIG. 5, the cable transfer interface 190 is a female receptacle, and the cable device 140 is a male terminal. The cable device 140 is capable of being stored separately or connected to the power adapting device 100 according to requirements.

Back to FIG. 4, when the protection switch 160 is turned on and the cable device 140 is connected and transmits the external AC power signal to the power adapting device 100, the external AC power signal will be transmitted to the first power adapter interface 122 and the power conversion module 134. Preferably, the first power adapter interface 122 and the power conversion module 134 are electrically connected in parallel. The power conversion module 134 is capable of converting the received AC power signal into a rectifier of the DC power signal, and the power conversion module 134 can further adjust the voltage of the power signal according to requirements. Next, the power conversion module 134 transmits the converted DC power signal to the second power adapter interface 132.

Figure 6:
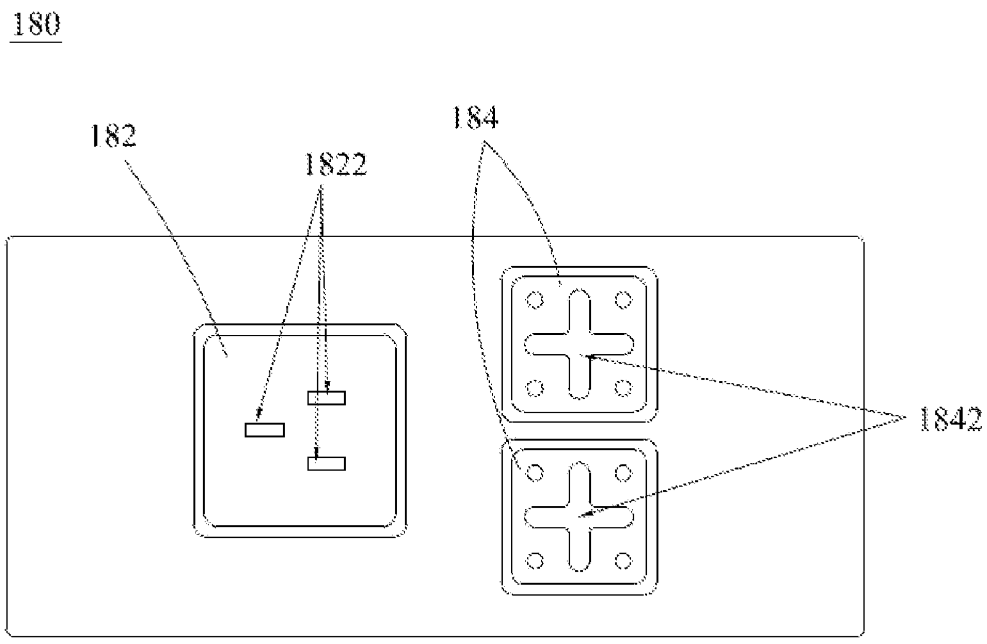
FIG. 6 is a top view of the upper housing of the power adapting device according to one embodiment of the present disclosure.
Figure 7:
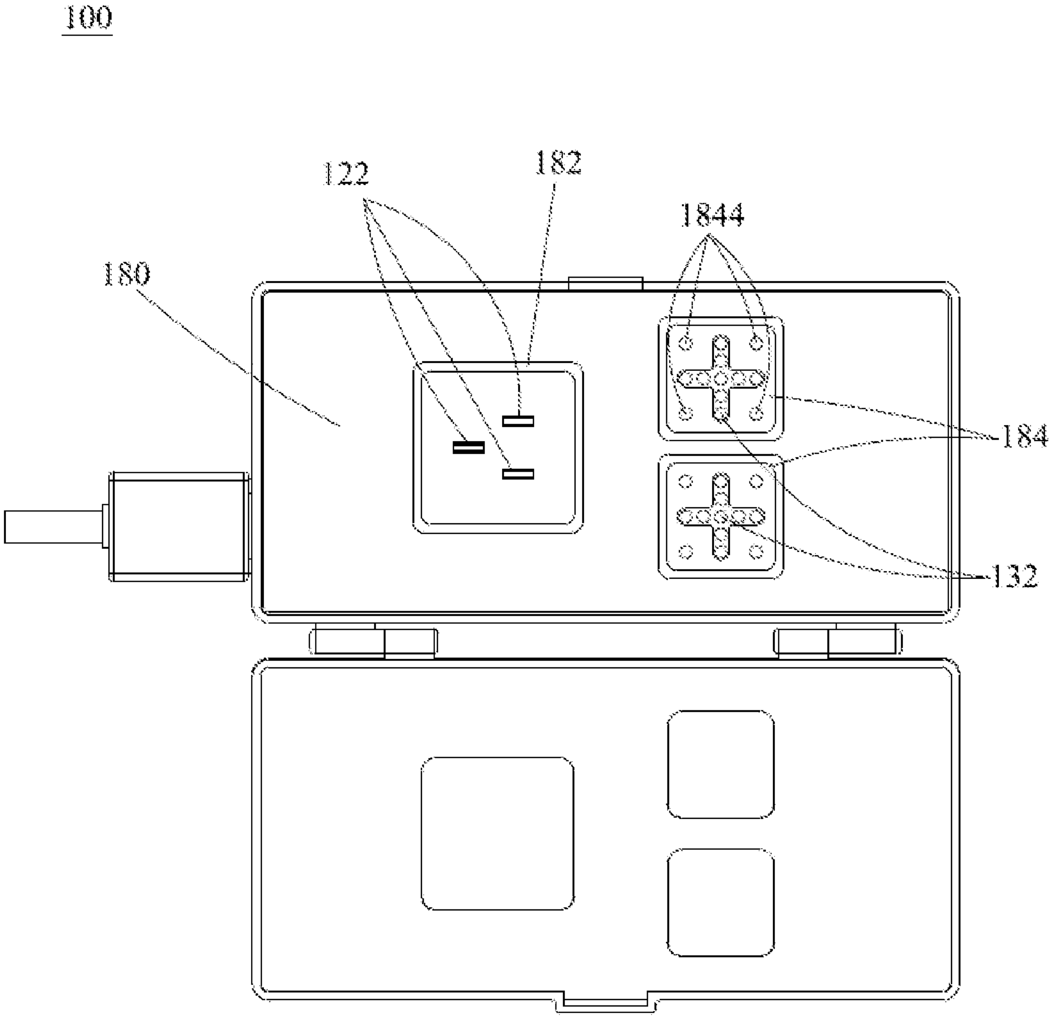
FIG. 7 is a top view of the power adapting device according to one embodiment of the present disclosure.

Please refer to FIGS. 6 and 7 at the same time, FIG. 6 is a top view of the upper housing 170 of the power adapting device 100 according to one embodiment of the present disclosure. FIG. 7 is a top view of the power adapting device 100 according to one embodiment of the present disclosure. The first slot 182 and the second slot 184 of the upper housing 180 of the power adapting device 100 are respectively provided with at least one opening 1822 and at least one opening 1842. The openings 1822 are disposed corresponding to the first power adapter interface 122, and the openings 1842 are disposed corresponding to the second power adapter interface 132. From the top view of the power adapting device 100 in FIG. 6, the first power adapter interface 122 below can be seen from the openings 1822 of the first slot 182, while the second power adapter 132 below can be seen from the openings 1842 of the second slot 184. When the first power adapter 120 is connected to the first slot 182, it can further contact the first power adapter interface 122 through the openings 1822 for electrical connection, and receive the AC power signal provided by the first power adapter interface 122. When the second power adapter 130 is connected to the second slot 184, it can further contact the second power adapter interface 132 through the openings 1842 for electrical connection, and receive the DC power signal provided by the second power adapter interface 132.

In the above embodiment, the second slot 184 of the upper housing 180 is further provided with a magnetic component 1844. When the second power adapter 130 is connected to the second slot 184, the magnetic component 1844 is capable of attracting the second power adapter 130 by magnetic force to strengthen the connection and fixation therebetween and prevent the transmission instability or signal termination caused by the accidental loosening of the second power adapter 130.

Figure 8:
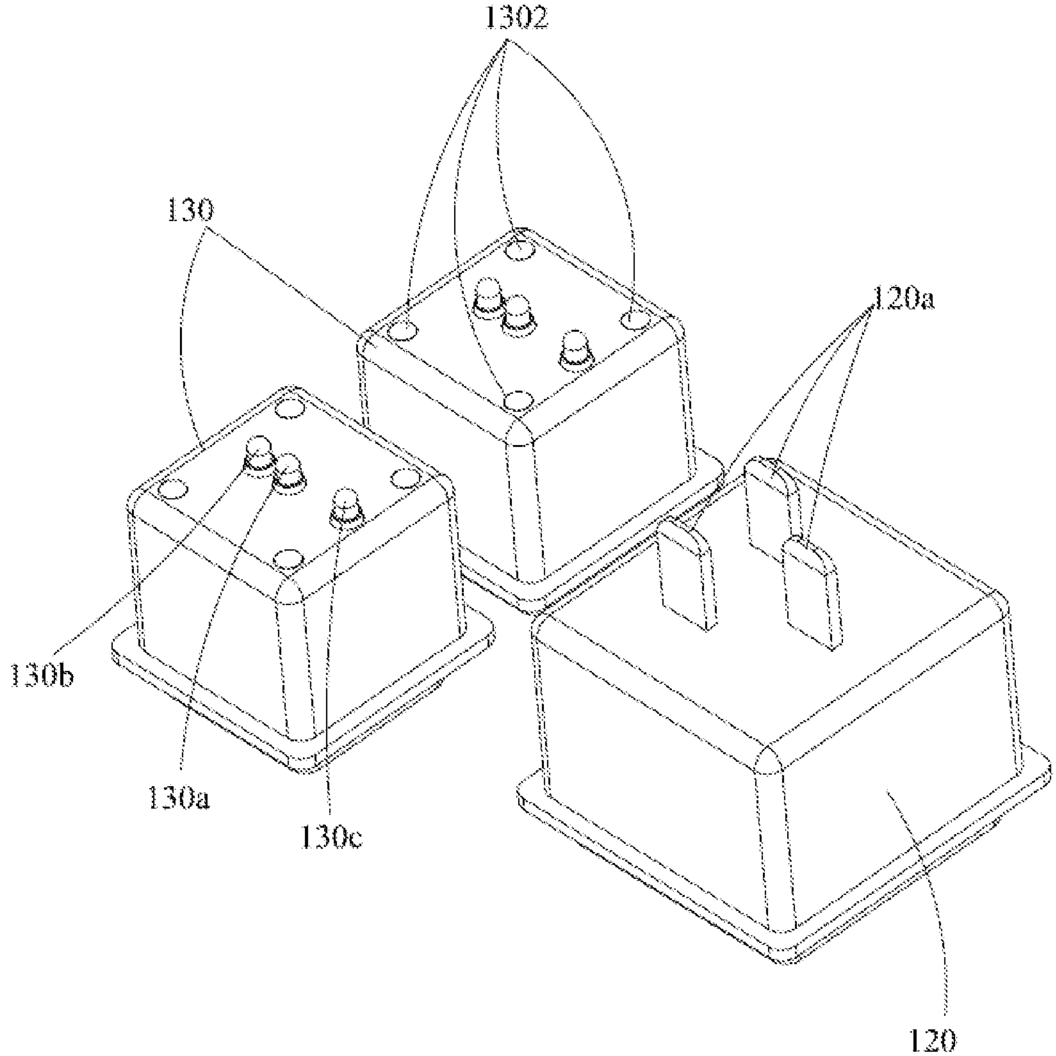
FIG. 8 is a schematic diagram of a bottom of the first power adapter and the second power adapter of the power adapting device according to one embodiment of the present disclosure.

In another embodiment of the present disclosure, the second power adapter 130 may also be provided with magnetic components, as shown in FIG. 8, which is a schematic diagram of a bottom of the first power adapter 120 and the second power adapter 130 of the power adapting device 100 according to one embodiment of the present disclosure. The first power adapter 120, for example, is a three pin adapter, which is connected to the first slot 182 to correspond with the three-hole receptacle of the first power adapter interface 122. The second power adapter 130 is, for example, a pogo pin or a terminal suitable for pogo pin, which is connected to the second slot 184 to correspond with the pogo pin of the second power adapter interface 132. The second power adapter 130 is provided with a magnetic component 1302, which is capable of attracting the second power adapter interface 132 by magnetic force to strengthen the connection and fixation of the two.

In one embodiment, the second slot 184 may be provided with a magnetic component 1844, while the second power adapter 130 is not provided with a magnetic component 1302. In this embodiment, the second power adapter 130 may be provided with a ferromagnetic (strong magnetic) metal corresponding to the magnetic component 1844 for being attracted by the magnetic component 1844.

In another embodiment, the second slot 184 is not provided with a magnetic component 1844, while the second power adapter 130 is provided with a magnetic component 1302. In this embodiment, the second slot 184 may be provided with a ferromagnetic (strong magnetic) metal corresponding to the magnetic component 1302 for being attracted by the magnetic component 1302.

In another embodiment, the second slot 184 and the second power adapter 130 are simultaneously provided with their respective magnetic component 1844 and magnetic component 1302. The magnetic component 1844 and the magnetic component 1302 are correspondingly disposed to attract each other.

Please continue to FIG. 8. The bottom of the first power adapter 120 is further provided with three protruding adapter terminals 120*a*, which are, for example, three-pin plugs of a common household power supply, which are used to electrically connect the three-hole receptacle of the first power adapter interface 122. The bottom of the second power adapter 130 is further provided with adapter terminals 130*a*, 130*b*, and 130*c*, which are, for example, for electrically connecting pogo pin, which is used for electrically connecting the second power adapter interface 132.

Figure 9:
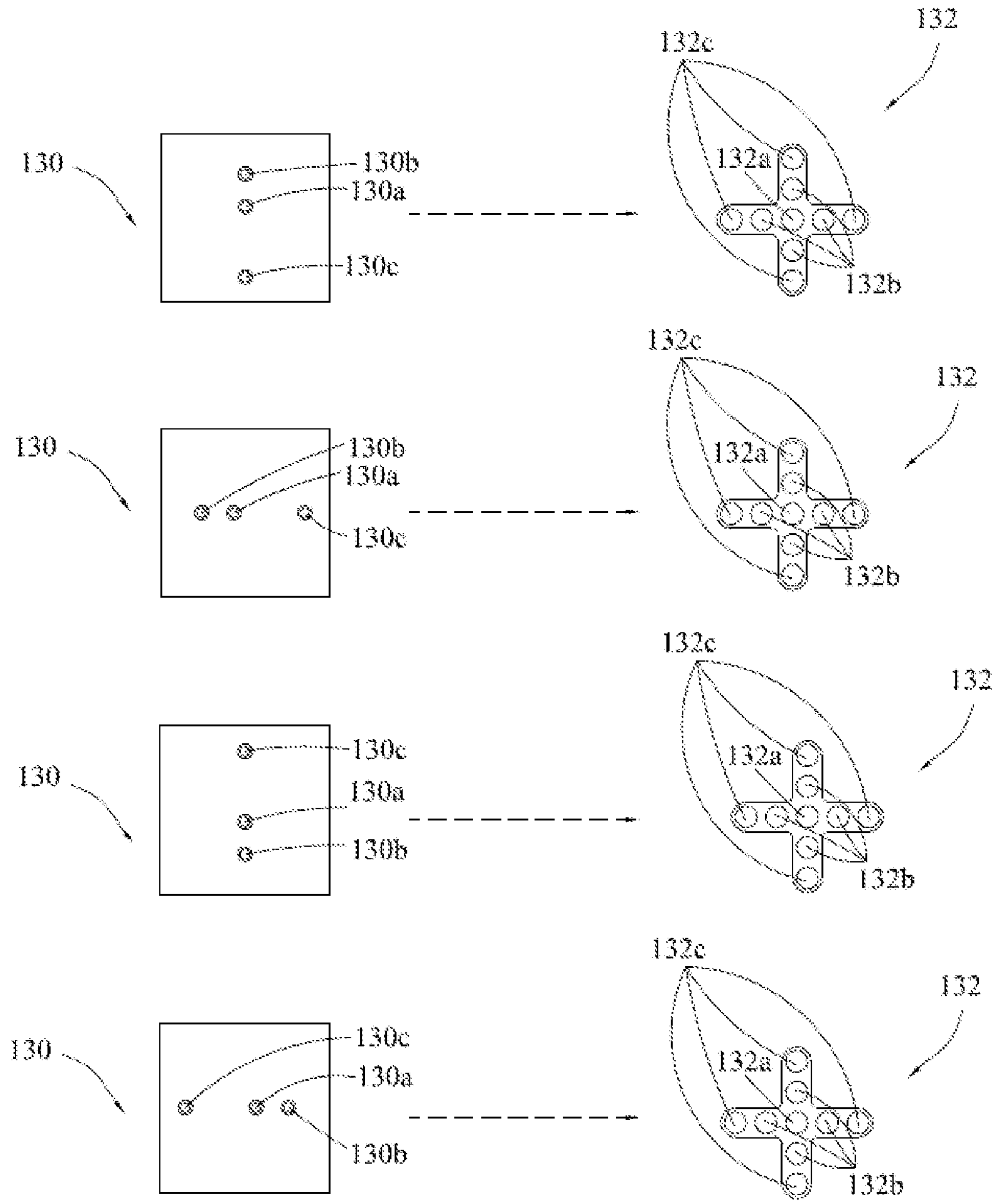
FIG. 9 is a connection direction diagram of the second power adapter and the second power adapter interface of the power adapting device according to one embodiment of the present disclosure.

For the detailed connection mode of the second power adapter 130 and the second power adapter interface 132, please refer to FIG. 9, which is a connection direction diagram of the second power adapter 130 and the second power adapter interface 132 of the power adapting device 100 according to one embodiment of the present disclosure. In this embodiment, the second power adapter interface 132 may be, not for limitation, cross shaped, and is provided with interface terminals 132*a*, 132*b*, and 132*c*, such as the aforementioned pogo pin. The interface terminal 132*a* at the center has the first voltage level, the four corresponding interface terminals 132*b* adjacent to the interface terminal 132*a* have the second voltage level, and the four corresponding interface terminals 132*c* at the outermost have the third voltage level.

For example, the adapter terminals 130*a*, 130*b*, and 130*c* of the second power adapter 130 are arranged in a straight line. The adapter terminal 130*a* is used to electrically connect the interface terminal 132*a* to receive the first voltage level, the adapter terminal 130*b* is used to electrically connect the interface terminal 132*b* to receive the second voltage level, and the adapter terminal 130*c* is used to electrically connect the interface terminal 132*c* to receive the third voltage level. As shown in FIG. 9, no matter how the second power adapter 130 turns, its adapter terminals 130*a*, 130*b*, and 130*c* is capable of being sequentially corresponding to interface terminals 132*a*, 132*b*, and 132*c* to receive the corresponding correct voltage. Therefore, the second power adapter 130 does not need to access the second slot 184 in a specific direction to electrically connect the second power adapter 130.

Figure 10:
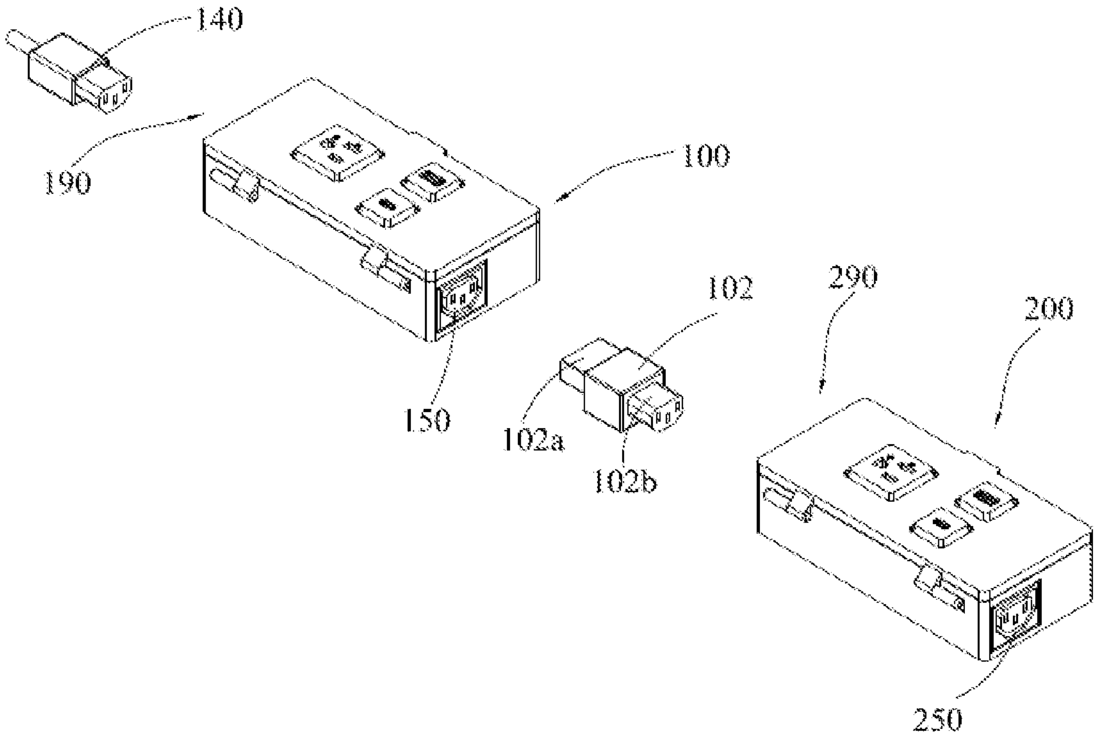
FIG. 10 illustrates two power adapting devices and an expansion adapter according to one embodiment of the present disclosure.
Figure 11:
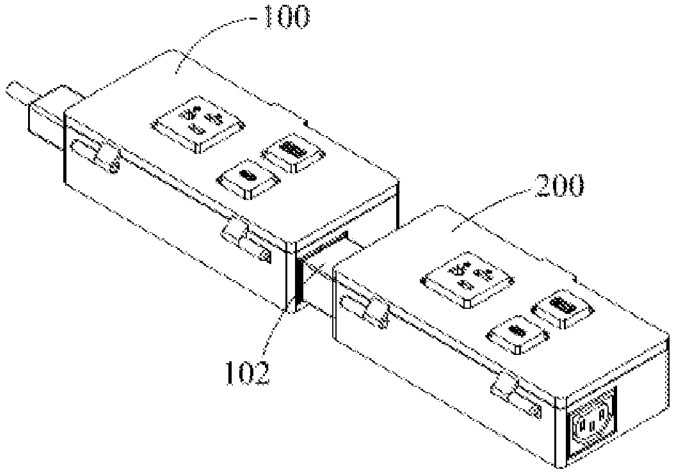
FIG. 11 illustrates the two power adapting devices in FIG. 10 are connected with each other through the expansion adapter according to one embodiment of the present disclosure.

Please refer to FIGS. 10 and 11, FIG. 10 illustrates two power adapting devices and an expansion adapter according to one embodiment of the present disclosure. FIG. 11 illustrates the two power adapting devices in FIG. 10 are connected with each other through the expansion adapter according to one embodiment of the present disclosure. The power adapting device 100 further comprises an expansion adapter 102, which is used to connect the power adapting device 100 and the power adapting device 200 in series. The power adapting device 200 is the same product as the power adapting device 100. The power adapting device 200 has an expansion interface 250 and a cable transfer interface 290. In detail, the expansion adapter 102 has a first end 102*a* and a second end 102*b*. The first end 102*a* of the expansion adapter 102 is used to connect the expansion interface 150 of the power adapting device 100, and the second end 102*b* is used to connect the cable transfer interface 290 of the power adapting device 200.

In one embodiment, the first end 102*a* of the expansion adapter 102 is a female receptacle that is the same as the cable transfer interface 190, and the expansion interface 150 is a male plug that is the same as the cable device 140. Therefore, the first end 102*a* of the expansion adapter 102 is capable of being connected to the expansion interface 150. In addition, the second end 102*b* of the expansion adapter 102 is a male plug that is the same as the cable device 140. Therefore, the second end 102*b* of the expansion adapter 102 is capable of being connected to the expansion interface 250 of the power adapter 200. The connection between the power adapting device 100 and the power adapting device 200 is shown in FIG. 11.

In the above embodiment, when the cable device 140 is connected to the power adapting device 100 and powered on, the external AC current is capable of being directly transmitted to the expansion interface 150 to further power the power adapting device 200 through the connection of the expansion adapter 102. The external AC current is also capable of being converted into DC current through the power conversion module 134, and the converted DC current is transmitted to the expansion interface 150 to further supply power to the power adapting device 200 through the connection of the expansion adapter 102.

It can be seen from the above that the power adapting device 200 can also be connected to the next same power adapting device through another expansion adapter. Therefore, by the teaching of the present disclosure, the power adapting device 100 can be expanded and extended according to actual needs.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A power adapting device, comprising:

an upper housing, comprising a first slot, wherein a first power adapter interface, disposed on a bottom of the first slot, is configured for conducting an alternate current (AC) power signal to an external device; and a second slot, wherein a second power adapter interface, disposed on a bottom of the second slot, is configured for conducting a direct current (DC) power signal to an external device;

a power conversion module, disposed corresponding to the second power adapter interface, configured to convert the AC power signal into the DC power signal and to transmit the converted DC power signal to the second power adapter interface; and a lower housing, engaging with the upper housing and covering the power conversion module with the upper housing, the lower housing comprising:

a cable transfer interface, electrically connected to an external power supply for transmitting the external power supply to the first power adapter interface or the power conversion module.

2. The power adapting device as claimed in claim 1, further comprising:

an expansion interface, electrically connected to the cable transfer interface or the power conversion module for transmitting the AC power signal or the DC power signal to another power adapting device.

3. The power adapting device as claimed in claim 1, wherein the second power adapter interface is a pogo pin.

4. The power adapting device as claimed in claim 1, further comprising:

a plurality of power adapters, correspondingly coupled to the first power adapter interface and the second power adapter interface, wherein the first power adapter interface conducts the AC power signal to the external device through one of the power adapters, and the second power adapter interface conducts the DC power signal to the external device through one of the power adapters.

5. The power adapting device as claimed in claim 4, wherein the power adapter corresponding to the second power adapter interface is provided with a magnetic component for attracting the second power adapter interface.

6. The power adapting device as claimed in claim 4, wherein the second power adapter interface is provided with a magnetic component for attracting the corresponding power adapter.

7. The power adapting device as claimed in claim 4, wherein the upper housing is provided with a plurality of slots, each of which is provided with an opening; each of the power adapters is installed in one of the plurality of slots to connect to the first power adapter interface or the second power adapter interface through the opening of the slots.

8. The power adapting device as claimed in claim 7, wherein a way in which the power adapters installed in the slots has no directionality.

9. The power adapting device as claimed in claim 4, wherein the lower housing is provided with a first side wall, a third side wall opposite to the first side wall, and a buckling portion disposed on the third side wall, and the power adapting device further comprises:

a flip cover, connected to the first side wall of the lower housing and provided with an engaging portion engaging the buckling portion of the lower housing to fix the power adapters.

10. The power adapting device as claimed in claim 1, wherein a size of the second slot is smaller than a size of the first slot.

11. The power adapting device as claimed in claim 2, further comprising:

an expansion adapter, provided with a first end connecting to the expansion interface and a second end connecting to a cable transfer interface of another power adapter.

12. The power adapting device as claimed in claim 11, wherein the first end of the expansion adapter is a female interface, and the second end is a male interface; or the first end of the expansion adapter is the male interface, and the second end is the female interface.

13. The power adapting device as claimed in claim 1, further comprising:

a cable device, electrically connected to the external power supply and the cable transfer interface.

14. The power adapting device as claimed in claim 1, further comprising:

a protection switch, controlling whether the cable transfer interface transmits the external power supply.

* * * * *